(12) United States Patent
Wilkie

(10) Patent No.: US 6,912,670 B2
(45) Date of Patent: Jun. 28, 2005

(54) PROCESSOR INTERNAL ERROR HANDLING IN AN SMP SERVER

(75) Inventor: Bruce James Wilkie, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 10/054,017

(22) Filed: Jan. 22, 2002

(65) Prior Publication Data

US 2003/0140285 A1 Jul. 24, 2003

(51) Int. Cl.[7] ............................................... G96F 11/30
(52) U.S. Cl. .............................. 714/13; 714/23; 714/45
(58) Field of Search ............................... 714/10, 11, 13, 714/23, 45, 723

(56) References Cited

U.S. PATENT DOCUMENTS

| | | | |
|---|---|---|---|
| 4,415,973 A | 11/1983 | Evans | |
| 4,860,196 A | 8/1989 | Wengert | |
| 5,280,606 A | 1/1994 | Jippo et al. | |
| 5,325,517 A | 6/1994 | Baker et al. | |
| 5,335,471 A | 8/1994 | Kupiec | |
| 5,491,788 A | 2/1996 | Cepulis | |
| 5,530,946 A | * 6/1996 | Bouvier et al. | 714/23 |
| 5,583,987 A | 12/1996 | Kobayashi et al. | |
| 5,864,653 A | 1/1999 | Tavallaei et al. | |
| 5,884,019 A | 3/1999 | Inaho | |
| 5,933,614 A | 8/1999 | Tavallaei et al. | |
| 6,081,865 A | 6/2000 | Tavallaei et al. | |
| 6,158,015 A | 12/2000 | Klein | |
| 6,233,680 B1 | * 5/2001 | Bossen et al. | 713/1 |
| 6,378,027 B1 | * 4/2002 | Bealkowski et al. | 710/302 |
| 6,516,429 B1 | * 2/2003 | Bossen et al. | 714/47 |
| 6,536,000 B1 | * 3/2003 | Jackson et al. | 714/57 |
| 6,550,019 B1 | * 4/2003 | Ahrens et al. | 714/10 |
| 6,574,748 B1 | * 6/2003 | Andress et al. | 714/11 |
| 6,708,297 B1 | * 3/2004 | Bassel | 714/47 |
| 6,742,139 B1 | * 5/2004 | Forsman et al. | 714/23 |

* cited by examiner

*Primary Examiner*—Scott Baderman
(74) *Attorney, Agent, or Firm*—Joseph P. Lally; Martin J. McKinley

(57) ABSTRACT

A system and method for handling processor internal errors in a data processing system. The data processing system typically includes a set of main microprocessors that have access to a common system memory via a system bus. The system may further include a service processor that is connected to at least one of the main processors. In addition, the system includes internal error handling hardware configured to log and process internal errors generated by one or more of the main processors. The internal error hardware may include error detection logic configured to receive internal error signals from the main processors. In response to receiving one or more IERR signals, the error detection logic is configured to assert and error detected signal that is received by error logging logic. The error logging logic is configured to update one or more error status register when the error detected signal is asserted. When the error logging logic has updated the status registers, is configured to assert an error logging complete signal that is received by processing control logic. The processor control logic is configured to assert one or more processor enable signals based on the state of the error status registers. In addition, upon completion of the error status update by the error logging logic, the status register is configured to assert an error status updated signal that ultimately produces a system reset. By incorporating error logging and handling into dedicated hardware tied directly to the processor internal error signals, the invention provides a low cost, low response latency mechanism for handling processor internal errors in high performance multiprocessor systems.

14 Claims, 3 Drawing Sheets

PROCESSOR INTERNAL ERROR HANDLING IN AN SMP SERVER

BACKGROUND

1. Field of the Present Invention

The present invention generally relates to the field of microprocessor-based data processing systems and more particularly to a system and method for efficient handling of processor internal errors in a symmetric multiprocessor server system.

2. History of Related Art

Interrupt handling is well known in the field of microprocessors and microprocessor-based data processing devices. Traditionally, the handling of processor internal errors (IERRs) in a symmetric multiprocessor (SMP) system has been the responsibility of a System management interrupt (SMI) handler. The SMI typically performs the tasks of logging the error condition and setting the appropriate controls to remove the faulty processor from the available resources.

Unfortunately, delegating processor internal error handling to the SMI is problematic. More specifically, the SMI is not immediately available when a server is powered-on. The SMI is usually installed as part of the power on self test (POST). If an internal error occurs before the SMI is installed and functioning, status cannot be reported and the system will probably halt. In addition, relying on the SMI to handler IERRs assumes that at least one of the processor is sufficiently operable to execute the SMI. If this assumption is not met, system behavior is unpredictable and the system will more than likely abort operation with little information to indicate the reason for the failure. Moreover, while it might be tempting to use the service processor found on many server blades to respond to the error and execute the SMI, the response latency of conventional service processors relative to high end SMP servers is too great to ensure that erroneous data is not propagated thereby possibly contaminating stored data records.

It would therefore be highly desirable to implement a data processing system in which processor internal errors are handled expeditiously. It would be further desirable if the implemented solution did not rely on the main processors to handle processor internal errors. It would be still further desirable if the response performance of the implemented solution was compatible with the requirements of high end multiprocessor systems.

SUMMARY OF THE INVENTION

The problem identified above is in large part addressed by a system and method for handling processor internal errors in a data processing system. The data processing system typically includes a set of main microprocessors that have access to a common system memory via a system bus. The system may further include a service processor that is connected to at least one of the main processors. In addition, the system includes internal error handling hardware configured to log and process internal errors generated by one or more of the main processors. The internal error hardware may include error detection logic configured to receive internal error signals from the main processors. In response to receiving one or more IERR signals, the error detection logic is configured to assert and error detected signal that is received by error logging logic. The error logging logic is configured to update one or more error status register entries when the error detected signal is asserted. When the error logging logic has updated the status register entries, it is configured to assert an error logging complete signal that is received by processor control logic and by any external service processor, for purposes of maintaining system error logs. The processor control logic is configured to de-assert one or more processor enable signals based on the state of the error status registers. In addition, upon completion of the error status update by the error logging logic, the status register is configured to assert an error status updated signal that ultimately produces a system reset. By incorporating error logging and handling into dedicated hardware tied directly to the processor internal error signals, the invention provides a low cost, low response latency mechanism for handling processor internal errors in high performance multiprocessor systems.

BRIEF DESCRIPTION OF THE DRAWINGS

Other objects and advantages of the invention will become apparent upon reading the following detailed description and upon reference to the accompanying drawings in which.

Figure 1:
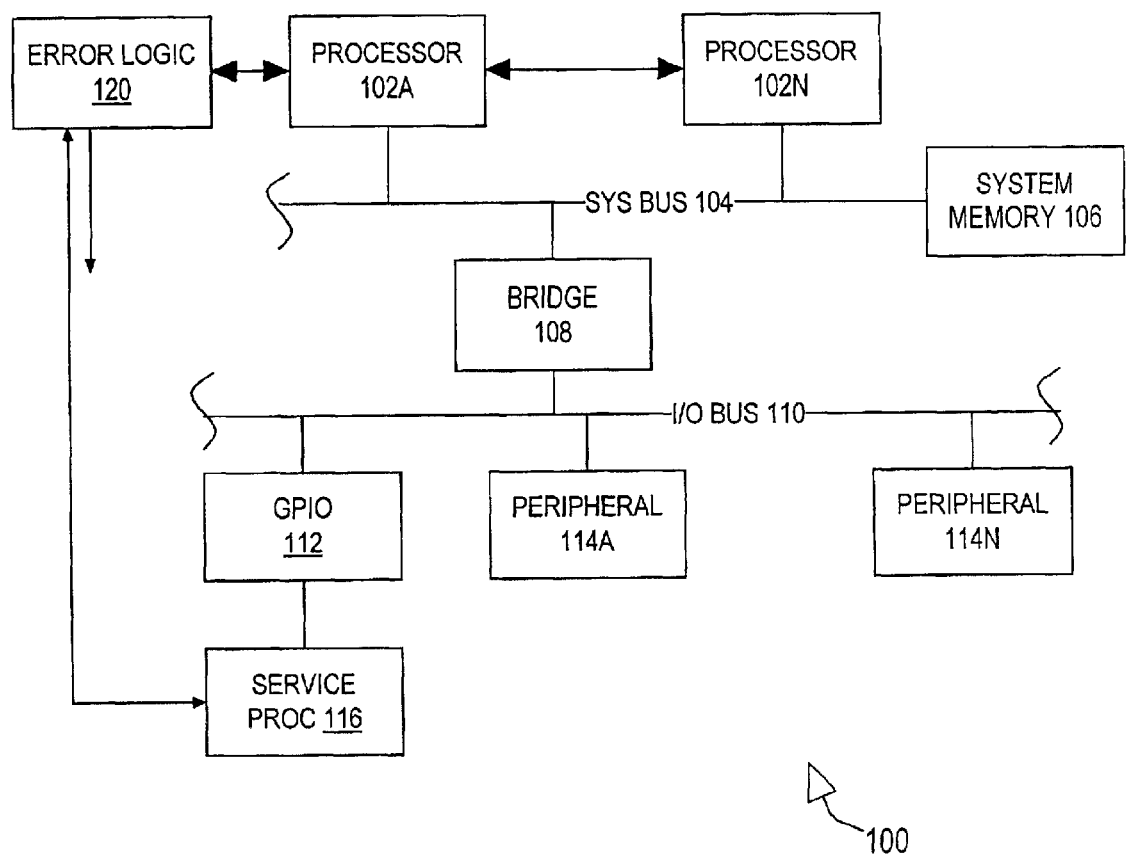
FIG. 1 is a block diagram of selected features of a data processing system according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a system and method for handling processor internal errors in a multiprocessor system such as a high end SMP server system. The system incorporates internal error control logic to detect, log, and respond to processor internal errors generated by one or more of the system's multiple main processors. The control logic is configured to determine which processor(s) have issued an internal error, update an error status register to log the error, notify any external service processor of the error, and restart the system with any remaining functional processor(s).

Turning now to the drawings, FIG. 1 is a block diagram of selected features of a data processing system according to one embodiment of the present invention. In the depicted embodiment, system 100 includes a set of main processors 102A through 102N (generically or collectively referred to as processor(s) 102) that are connected to a system bus 104. A common system memory 106 is accessible to each processor 102 via system bus 104. System memory 106 is typically implemented with a volatile storage medium such as an array of dynamic random access memory (DRAM) devices. Because each processor 102 has substantially equal access to system memory 106 (i.e., the memory access time is substantially independent of the processor), the depicted architecture of system 100 is commonly referred to as a symmetric multiprocessor system.

In the depicted embodiment of system 100, a bus bridge 108 provides an interface between system bus 104 and an I/O bus 110 to which one or more peripheral devices 114A through 114N (generically or collectively referred to as peripheral device(s) 114) are connected. I/O bus 110 is typically compliant with one of several industry standard I/O bus specifications including, as an example, the Peripheral Components Interface (PCI) bus as specified in *PCI Local Bus Specification* Rev 2.2 by the PCI Special Interest Group (www.pcisig.com). Peripheral devices 114 may include devices such as a graphics adapter, high-speed network adapter, hard-disk controller, and the like.

The depicted embodiment of system 100 further includes a general purpose I/O (GPIO) port 112 connected to I/O bus 110 and to which a service processor 116 is connected. Service processor 116 is used to provide support for low-level system functions such as power monitoring, cooling fan control, hardware error logging, and so forth.

System 100 according to the present invention further includes error logic 120. Error logic 120 is connected to the set of main processors 102 to provide a fast response to a processor internal error. The use of dedicated hardware to respond to processor internal errors beneficially eliminates dependence on error handling software that may or may not be available at the time a processor internal error is issued.

Figure 2:
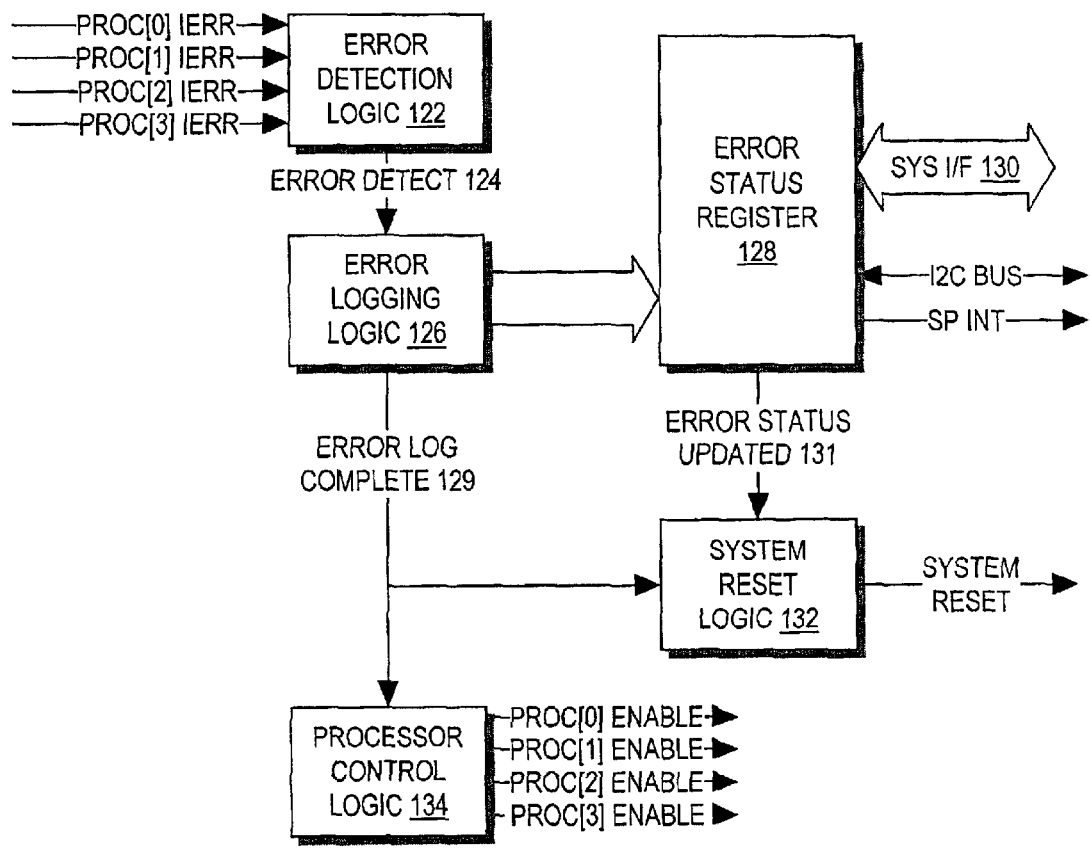
FIG. 2 is a block diagram of selected features of error logic in the data processing system of FIG. 1.

Referring now to FIG. 2, a block diagram of selected elements of error logic 120 according to one embodiment of the present invention is depicted. Error logic 120 comprises dedicated hardware that is integrated into the main system control logic and connected directly to system power. As such, error logic 120 is functional as soon power is applied to system 100 in contrast to system management interrupt (SMI) software modules, which are installed as part of the POST. In the depicted embodiment, error logic 120 includes an error detection unit 122 that is configured to receive processor internal error signals from each of the main processors 102. Processor internal error signals are generally asserted when a processor detects an error unrelated to processor bus operation. If, for example, a processor with an internal cache memory detects a parity error in the cache, the error may result in the assertion of the internal error signal. The internal error signal may be referred to herein as the IERR signal consistent with the notation commonly in use for the Pentium® family of processors from Intel Corporation.

Error detection unit 122 is further configured to assert an error detect signal 124 upon determining that one or more of the processor IERR signals has been asserted by its corresponding processor. Error detection unit 122 may include suitable latching circuitry to prevent an asserted IERR signal from being reset prematurely and additional logic to produce a pulse on error detect signal 124 in response to an IERR signal such that error detect 124 is pulsed once and only once for each internal error "event" where an event lasts from the assertion of any IERR signal until a system reset is initiated.

Error detect signal 124 provides an input to error logging unit 124. Error logging unit 124 is configured to document an internal error by capturing the identity of the offending processor. Because the error detection logic is not resident on the processor bus, it does not have visibility to the internal registers of the processors. In most cases when a processor asserts IERR, the processor has experienced an internal fatal error rendering most of its information unusable.

Figure 3:
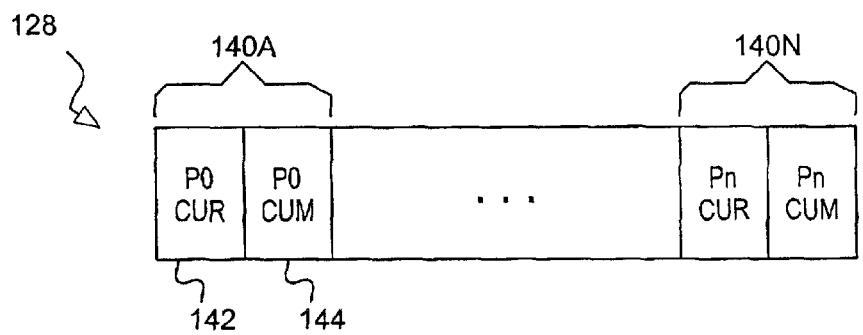
FIG. 3 depicts a portion of an embodiment of an error status register suitable for use in the error logic of FIG. 2.

Error logging unit 126 is configured to record and preserve IERR information in an Error Status Register 128. Error status register 128 is configured to store internal error status for each processor 102 of system 100. Referring to FIG. 3, a selected portion of one embodiment of error status register 128 is depicted. In this embodiment, error status register 128 includes a set of bit pairs 140A through 140N (generically of collectively referred to as bit pair(s) 140) for each processor 102. A first bit 142 of each bit pair 140 is a "current" bit that indicates whether the corresponding processor 102 is currently asserting its internal error signal while a second bit 144 of each bit pair 140 is a "cumulative" bit that indicates whether the corresponding processor has previously asserted its internal error signal. Whereas the current bits 142 are cleared each time a system reset occurs, the cumulative bits 144 are preserved. Thus, the set of cumulative bits 144 indicate the cumulative set of processors 102 that have internal error problems.

In the depicted embodiment, error status register 128 is accessible to the other components in system 100 through a system interface, such as an Industry Standard Architecture (ISA) bus, identified by reference numeral 130. System interface 130 may include sufficient data, address, and control signals to permit processors 102 to read the contents of status register 128. In addition, error status register 128 may include a one or more bits set in response to an internal error event that provide an interrupt signal to service processor (SP) 116 such that service processor 116 is interrupted in response to a main processor internal error event. In response to an interrupt from error logging unit 128, service processor 116 may be programmed to take specific actions with respect to system power such as powering down and so forth. In addition, service processor 116 may be programmed to log or record additional information regarding the internal error. This additional information may include, for example, the time at which an internal error signal was asserted.

The depicted embodiment of error status register 128 further includes an I2C interface for connecting to an I2C bus thereby enabling communication between error status register 128 and an external device in the event that it becomes desirable to access the contents of register 128 externally.

Error logging unit 126, in addition to providing logged information to error status register 128, is configured to generate an error log complete signal 129 when the logging unit has completed its documentation of an internal error event. Error log complete signal 129 is provided to a system reset unit 132 and a processor control unit 134. System reset logic 132 is configured to generate a system reset that is provided to each processor 102 following an internal error event. System reset logic 132 may be further controlled by an error status updated signal 131 produced by error status register 128 indicating completion of a status register update following an internal error event. Processor control logic 134 is configured to generate a unique processor enable signal for each processor 102 in system 100 following an internal error event. The processor enable signals are de-asserted if the corresponding processor was responsible for the internal error event and the cause of the internal error could not be corrected. The combination of system reset unit 132 and processor control logic 134 provides means for initiating a system reset and enabling only those processors 102 that are functional following an internal error.

Figure 4:
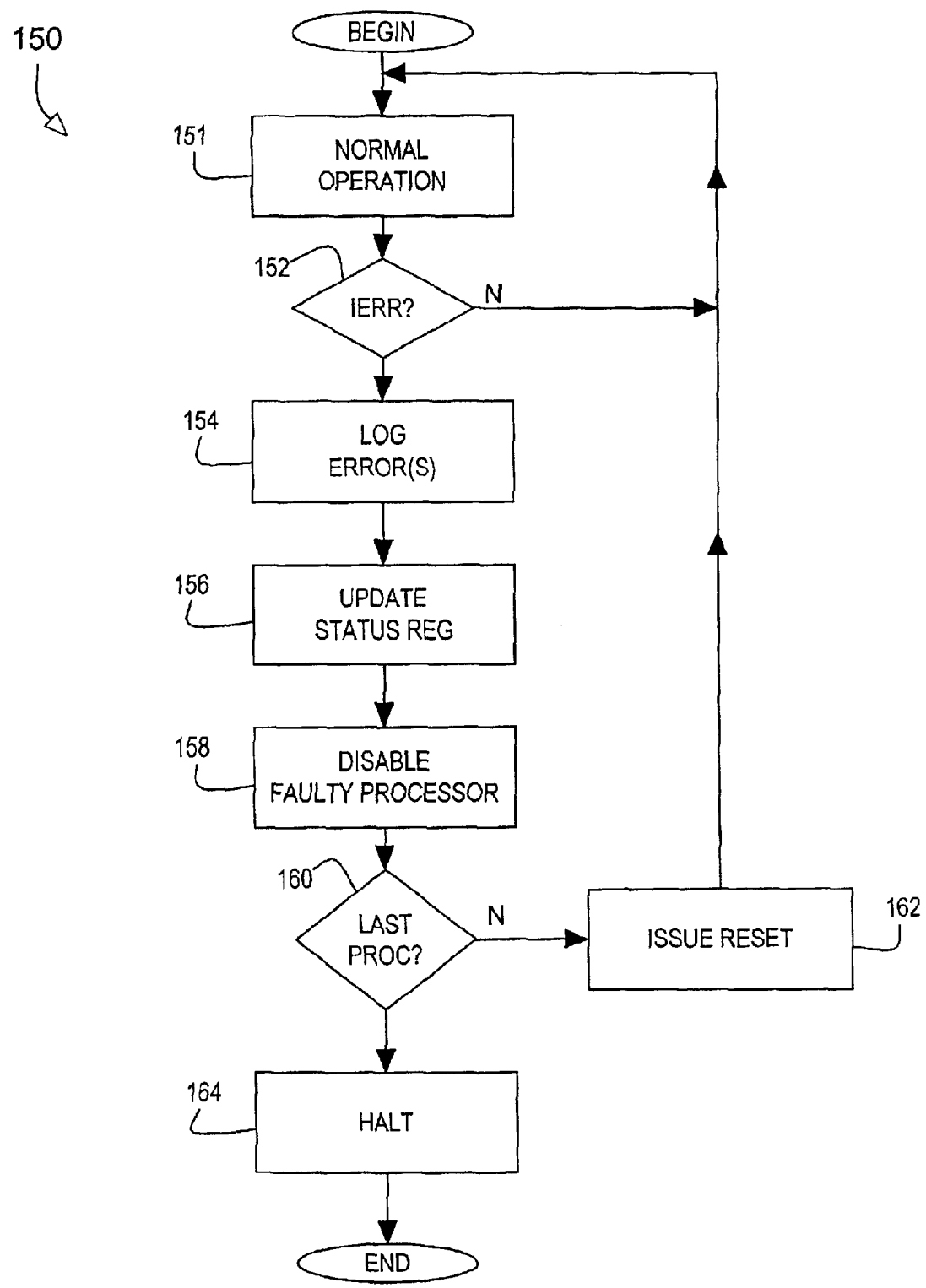
FIG. 4 is a flow diagram illustrating a method of handling internal error signals in a data processing system.

Turning now to FIG. 4, a flow diagram representing selected elements of a method 150 of responding to internal errors signals in a data processing system according to one embodiment of the invention is presented. Initially, the data processing system is executing (block 151) in a normal operating mode. For purposes of this disclosure, the normal operating mode represents any state following the application of power to the system in which the internal errors signals are not asserted. Accordingly, normal operating mode does not imply that an operating system has been installed and application programs are executing or capable of being executed. Instead, the normal operating mode could be achieved substantially immediately following the application of power to the system if none of the IERR signals is asserted.

The data processing system and, more particularly, the internal error logic of the system, monitors (block 152) for the assertion of an IERR signal by one or more of the main processors. As long as the main processors do not issue any internal error signals, the system remains in its normal operating mode. During this time, an operating system may be installed and one or more applications programs may be executing. If an internal error is detected, the error logic logs (block 154) the error and updates (block 156) the error status register as described in greater detail above. After updating the status register, the system disables (block 158) any nonfunctional main processors. The disabled processors would typically include any processors currently asserting their internal error signals as well as any processors that asserted their error signals previously. After disabling the appropriate main processors, the system determines (block 160) whether any functional processors remain in the system. If all processors are currently or have previously asserted their internal error signals, the error logic generates a system halt (block 164). If there are one or more functional processors remaining, the error logic initiates a reset (block 162) to restart the system with the functional processors. In this manner, the data processing system is able to respond to internal errors without relying on any error handling software or operating system code.

It will be apparent to those skilled in the art having the benefit of this disclosure that the present invention contemplates a system and method for responding to processor internal errors in a data processing system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A data processing system, comprising:
   multiple main processors connected to a system bus;
   a system memory connected to the system bus and accessible to the main processors;
   error logic, external to the main processors, and configured to receive internal error signals asserted by the main processors and to respond to an internal error signal by disabling a main processor asserting an internal error signal and restarting the system with any remaining functional main processors, wherein the error logic includes an error status register accessible via an I2C bus; and
   a service processor configured to receive a service processor interrupt generated by the error logic.

2. The system of claim 1, wherein the error logic is further configured to record the internal error signal in an error status register of the error logic.

3. The system of claim 2, wherein the error status register includes at least a pair of bits corresponding to each of the main processors, wherein a first bit of each pair is indicative of whether the corresponding main processor is currently asserting its internal error signal and a second bit of each pair is indicative of whether the corresponding main processor has asserted its internal error signal previously.

4. The system of claim 1, wherein the error logic is functional substantially immediately following the application of power to the data processing system.

5. The system of claim 1, wherein the error logic includes an error detection unit configured to receive an internal error signal from each of the main processors and further configured to generate an error detect signal responsive to assertion of an internal error signal by any of the processors.

6. The system of claim 5, wherein the error logic further includes error logging logic configured to receive the error detect signal and, responsive thereto, to update an error statue register to reflect the internal error signal.

7. The system of claim 1, wherein responsive to the service processor interrupt, the service processor is configured to power down the system.

8. Error detection logic suitable for use in a data processing system having multiple main processors, wherein the error detection logic is external to the main processors and is configured to receive internal error signals asserted by the main processors and further configured to respond to an internal error signal by disabling a processor asserting signal, generating a service processor interrupt, and restarting the system with any remaining functional processors and further wherein the error detection logic includes an error status register externally accessible via an I2C bus.

9. The error logic of claim 8, wherein the error logic is further configured to record the internal error signal in the error status register of the error logic.

10. The error logic of claim 9, wherein the error status register includes at least a pair of bits corresponding to each of the main processors, wherein a first bit of each pair as indicative of whether the corresponding main processor is currently asserting its internal error signal and a second bit of each pair is indicative of whether the corresponding main processor has asserted its internal error signal previously.

11. The error logic of claim 8, wherein the error logic is functional substantially immediately following the application of power to the data processing system.

12. The error logic of claim 8, wherein the error logic includes an error detection unit configured to receive an internal error signal from each of the main processors and further configured to generate an error detect signal responsive to assertion of an internal error signal by any of the processors.

13. The error logic of claim 12, wherein the error logic further includes error logging logic configured to receive the error detect signal and, responsive thereto, to update the error status register to reflect the internal error signal.

14. The error logic of claim 13, wherein the error logic is further configured to generate the service processor interrupt responsive to error status register update.

* * * * *